United States Patent [19]

Laub

[11] Patent Number: 5,513,684

[45] Date of Patent: May 7, 1996

[54] ANTI-SKID DEVICE FOR AUTOMOBILE TIRES

[76] Inventor: Charles E. Laub, 32 Prices La., Staten Island, N.Y. 10314

[21] Appl. No.: 287,481

[22] Filed: Aug. 5, 1994

[51] Int. Cl.$^6$ .................................................. B60C 27/04
[52] U.S. Cl. ...................... 152/216; 152/225 R; 152/218
[58] Field of Search .................................... 152/181, 186, 152/216, 18, 225 C, 213 R

[56] References Cited

U.S. PATENT DOCUMENTS

| | | | |
|---|---|---|---|
| 2,770,280 | 11/1956 | Fries et al. | 152/216 |
| 3,190,335 | 6/1965 | Isaacman | 152/216 |
| 5,156,695 | 10/1992 | Martin | 152/216 |

Primary Examiner—Michael W. Ball
Assistant Examiner—Francis J. Lorin
Attorney, Agent, or Firm—Arthur I. Degenholtz

[57] ABSTRACT

A traction enhancing device for automobile tires includes a support ring and a plurality of cleat assemblies which are mounted on the support ring. The cleat assemblies include cleat members which extend over the tread portion of a tire and which include projections to enhance traction. The cleat members are able to slide inwardly in the cleat assemblies to accomodate flexing of the tire and the cleat members are attached to the cleat assemblies by latches which facilitate rapid installation and removal of the device without a need for tools of any type or for jacking up of the vehicle.

15 Claims, 5 Drawing Sheets

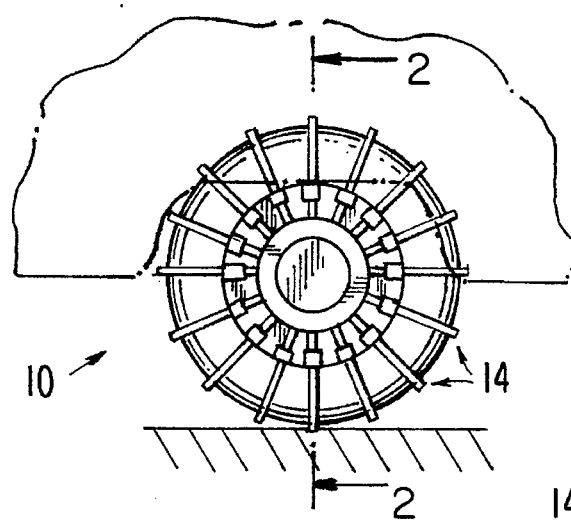
FIG. 1
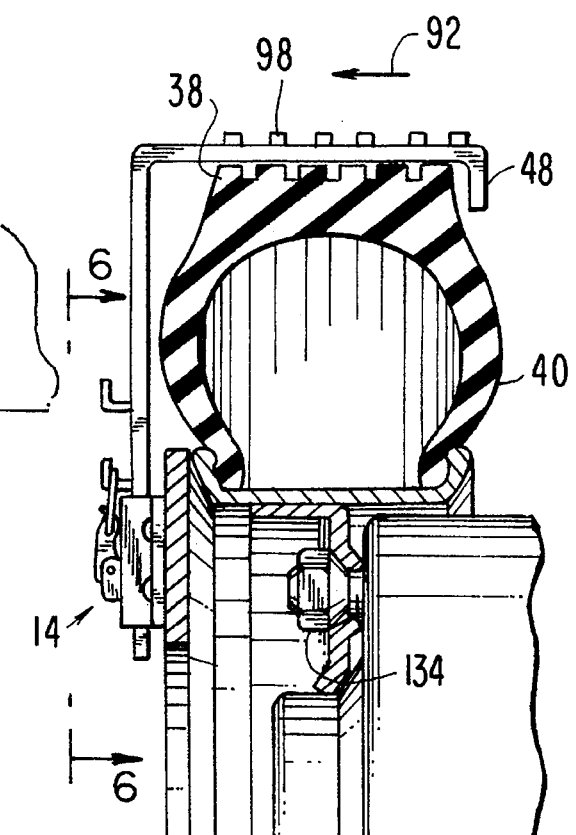
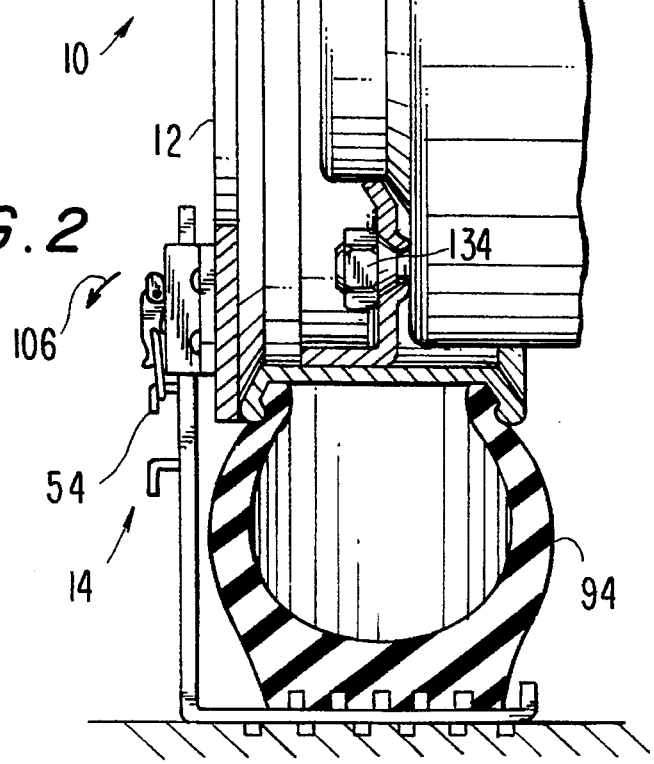
FIG. 2

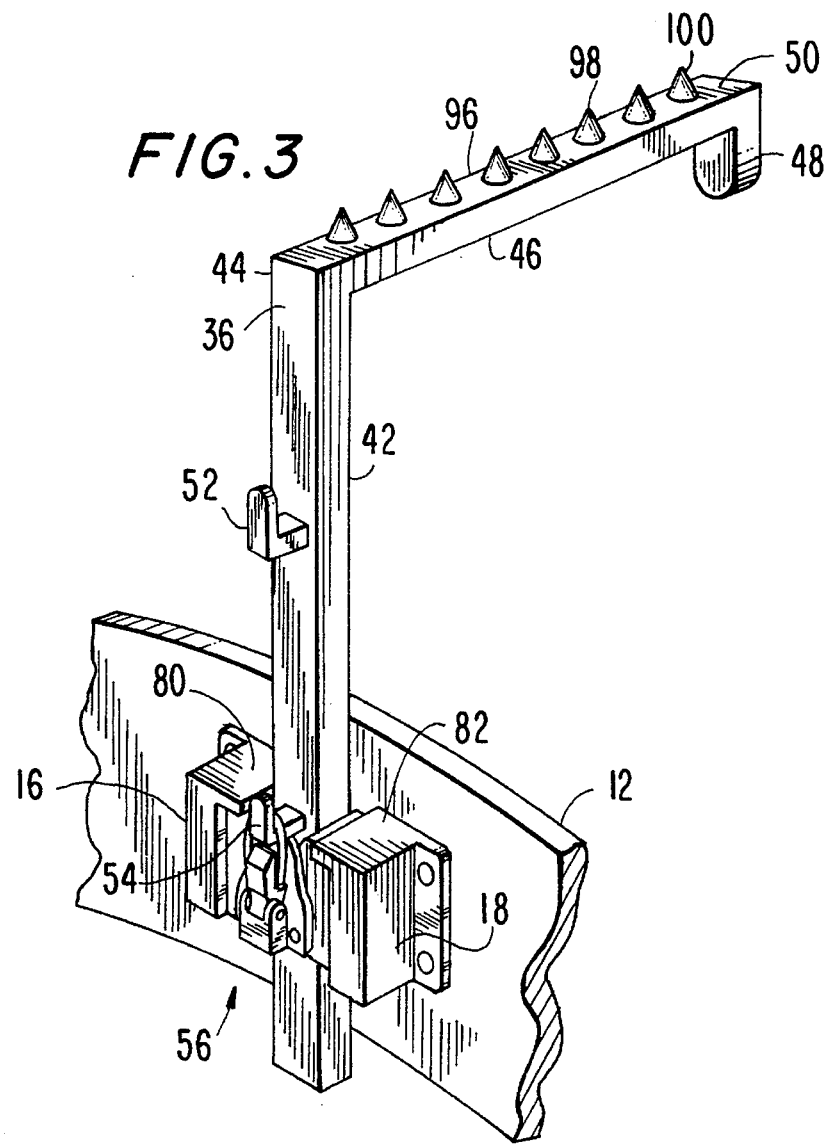
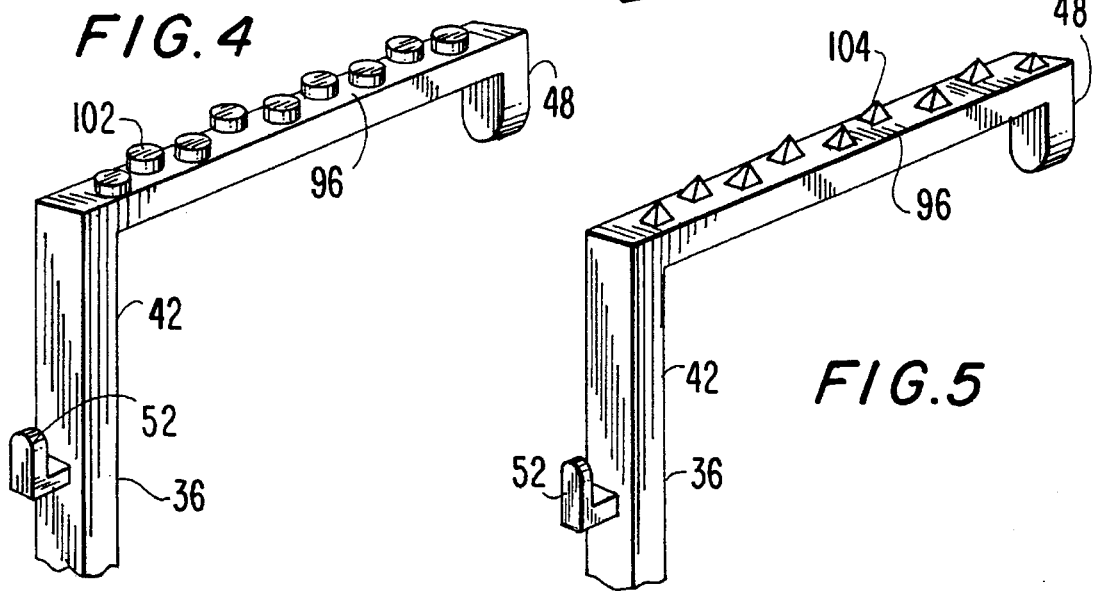

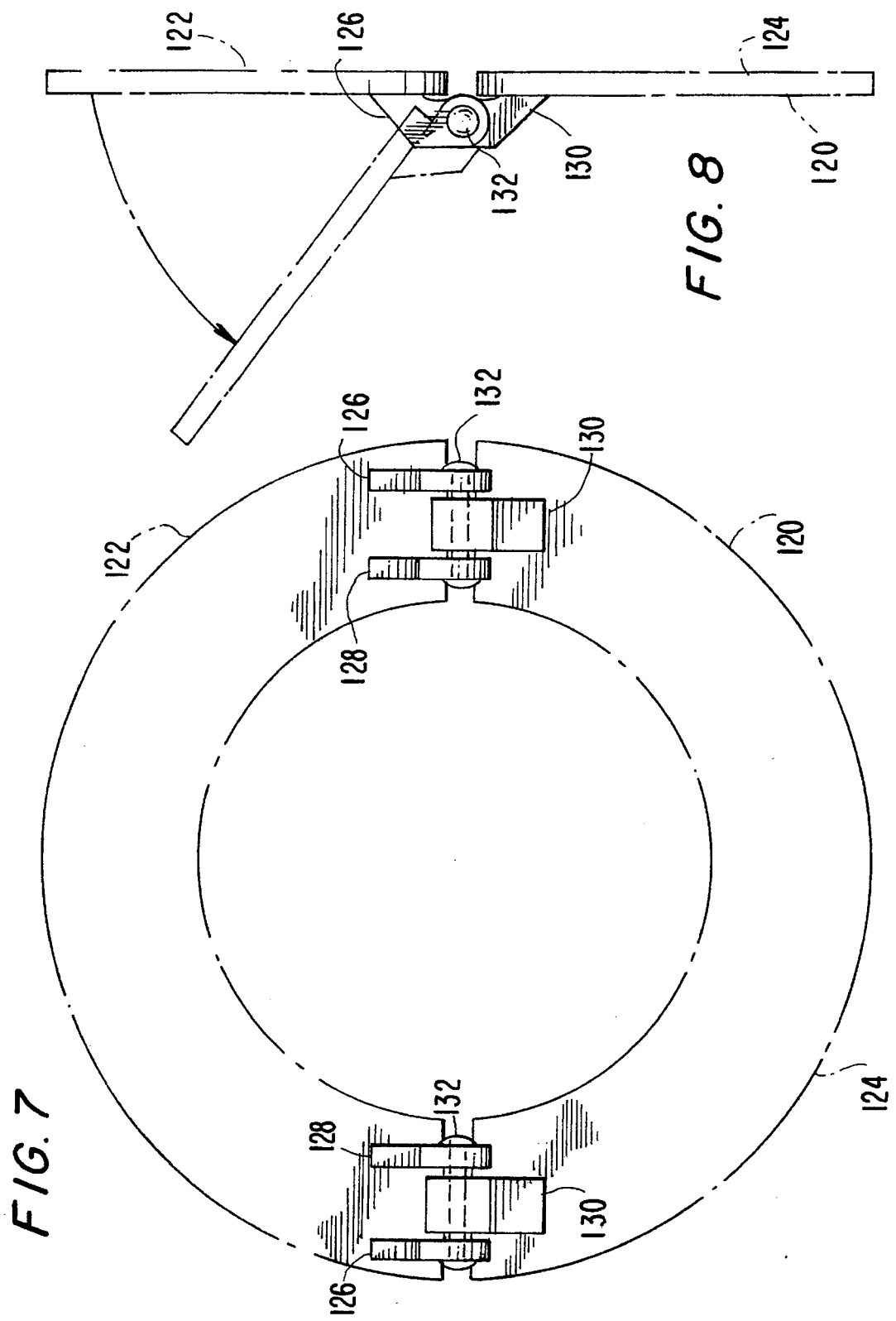

ANTI-SKID DEVICE FOR AUTOMOBILE TIRES

BACKGROUND OF THE INVENTION

The present invention relates generally to the field of traction assistance devices for automobiles and more particularly to an anti-skid device fop automobile tires to replace conventional snow chains for wintertime driving.

The prior apt related to traction assistance devices includes the following U.S. Pat. Nos.: 3,117,612 issued to Minutilla; 3,130,768 issued to Marten; 3,470,932 issued to Mathews; 4,038,272 issued to Lee; 4,228,838 issued to Zerlauth; 4,386,643 issued to Belknap III; 4,576,214 issued to Preusker; 4,862,936 issued to McDonough; 4,960,159 issued to Oda and 5,076,335 issued to Koshi.

U.S. Pat. No. 3,117,612 issued to Minutilla, shows a device which utilizes a central hub which is mounted on the hub of a vehicle via bolts and a plurality of L shaped members which ride in sleeves. Leaf springs in the sleeves provide friction in an attempt to prevent the L shaped members from falling out of the device.

U.S. Pat. No. 3,130,768 issued to Marten, shows a device in which a wheel disk is attached to the tire hub via lock nuts, and J hooks are attached to the wheel disk using a spring loaded linkage. A compression spring in the linkage allows the linkage to move in order to accomodate flexing of the tire.

U.S. Pat. No. 3,470,932 issued to Mathews, shows a device in which a central hub is mounted on a vehicle wheel using special tubular nuts which replace the original wheel securing nuts.

U.S. Pat. No. 4,036,272 issued to Lee, shows a device which includes a circumferential band which extends around the tread portion of a tire and which includes a series of projecting studs.

U.S. Pat. No. 4,228,838 issued to Zerlauth, shows a device which includes a base disk which is attached to a tire rim and a rotatable disk which is attached to the base disk. A series of link members can move from a retracted to an extended position to increase traction.

U.S. Pat. No. 4,386,643 issued to Balknap III et al, shows a device in which an L shaped member is mounted to the lock nut of a vehicle tire.

U.S. Pat. No. 4,576,214 issued to Preusker, shows a device which includes a supporting disk which is mounted to the tire hub with lock nuts. Anti-skid arms which extend across the tire treads are pivotally connected to the periphery of the supporting disk. The arms are permitted to pivot in order to accomodate flexing of the tire.

U.S. Pat. No. 4,862,936 issued to McDonough, shows a plurality of L shaped rods which are attached by flexible cords to a capstan. The capstan is mounted on the hub of vehicle wheel and rotation of the capstan draws the L shaped rods inwardly to grip the tire.

U.S. Pat. No. 4,960,159 issued to Oda, shows a device in which an annular plate is attached to the vehicle via lock nuts and a peripheral band member is mounted on the edge of the plate and supports a plurality of anti-skid arms that extend across the tire treads.

U.S. Pat. No. 5,076,335 issued to Koshi, shows a device which utilizes a plurality of crossbands which press against the treads of a tire. The crossbands are mounted on leaf springs which are attached to an inner ring and the inner ring is attached to a vehicle wheel through wheel nuts. The flexure of the tire causes elastic deformation of the leaf springs.

The devices of the prior art are generally complex in construction and require the use of tools for removal and reinstallation of wheel nuts and also generally require backing up of the vehicle as part of the installation procedure. Adverse weather conditions make the installation of the devices of the prior art extremely difficult to accomplish.

Despite the range of traction assistance devices in the prior art, there remains a need for an effective apparatus which can be installed and removed quickly and easily by a man or a woman under adverse weather conditions without jacking up the vehicle. The devices in the prior art require the use of tools for removal and reinstallation of wheel nuts and also generally require jacking up of the vehicle in order to install the devices. Adverse weather conditions make the installation of the devices of the prior art extremely difficult to accomplish.

The difficulty, inconvenience and time consuming installation associated with conventional snow tires, as well as the traction assistance devices of the prior art, results in the current situation in which many people often elect to drive without traction assistance. The lack of adequate traction under adverse weather conditions continues to cause accidents resulting in property damage, injury and, in some cases, death.

OBJECTS AND SUMMARY OF THE INVENTION

It is an object of the present invention to provide an anti-skid device for automobile tires which can be easily installed and removed even under adverse weather conditions.

Another object of the invention is to provide an anti-skid device for automobile tires which can be installed and removed without jacking up the vehicle.

Another object of the invention is to provide an anti-skid device for automobile tires which can be installed without the use of tools.

Another object of the invention is to provide an anti-skid device for automobile tires which will not cause damage to the roadway.

Another object of the invention is to provide an anti-skid device for automobile tires which can be easily stored when not in use.

Another object of the Invention is to provide an anti-skid device for automobile tires which is relatively light in weight.

Another object of the invention is to provide an anti-skid device for automobile tires which allows adequate inner fender clearance.

Another object of the invention is to provide an anti-skid device for automobile tires which is adjustable to allow installation on a range of tire sizes.

Another object of the invention is to provide an anti-skid device for automobile tires which can accomodate a range of adverse road conditions including both ice and deep snow.

Yet another object of the invention is to provide an anti-skid device for automobile tires which is composed of a relatively small number of component parts, each of which are simple to manufacture, resulting in a relatively low overall cost.

In accordance with the present invention there is provided an anti-skid device for automobile tires which includes a support ring and a plurality of cleat assemblies which are mounted on the support ring. The cleat assemblies each include a cleat member which extends over the tread portion of a tire and which includes projections to enhance traction. The cleat members are able to slide inwardly in the cleat assemblies to accomodate flexing of the tire and the cleat members are attached to the cleat assemblies by latches which facilitate rapid installation and removal of the device without a need for tools of any type or for jacking up the vehicle.

In an alternative embodiment of the invention the support ring is formed as a hinged member which enables the device to be folded for convenient storage.

In another alternative embodiment of the invention, the cleat member has an adjustable portion which facilitates adjustment of the horizontal portion of the cleat member which extends over the tread portion of the tire to accomodate tires of different widths.

BRIEF DESCRIPTION OF THE DRAWINGS

Other important objects and advantages of the present invention will be apparent from the following detailed description, taken in connection with accompanying drawings, in which:

FIG. 1 is a side elevation view of an anti-skid device for automobile tires in accordance with the present invention with the device shown mounted on an automobile tire;

FIG. 2 is a cross-sectional view taken along the line 2—2 of FIG. 1;

FIG. 3 is a fragmentary perspective view of one of the anti-skid assemblies of the anti-skid device of FIG. 1;

FIG. 4 is a fragmentary perspective view of an alternative cleat unit for use with the anti-skid device of FIG. 1;

FIG. 5 is a fragmentary perspective view of another alternative cleat unit for use with the anti-skid device of FIG. 1;

FIG. 7 is a front elevation view of an alternative support ring which incorporates a hinged construction and with the support ring shown removed from the anti-skid device of FIG. 1;

FIG. 8 is a side elevation view of the support ring of FIG. 7;

DETAILED DESCRIPTION OF THE INVENTION

With reference to the drawings there is shown in FIG.1 an anti-skid device for automobile tires 10 made in accordance with the present invention which includes a support ring 12 and a plurality of identical cleat assemblies 14. The cleat assemblies 14 are symmetrically mounted on the support ring 12 as is shown in FIG. 1.

Figure 6:
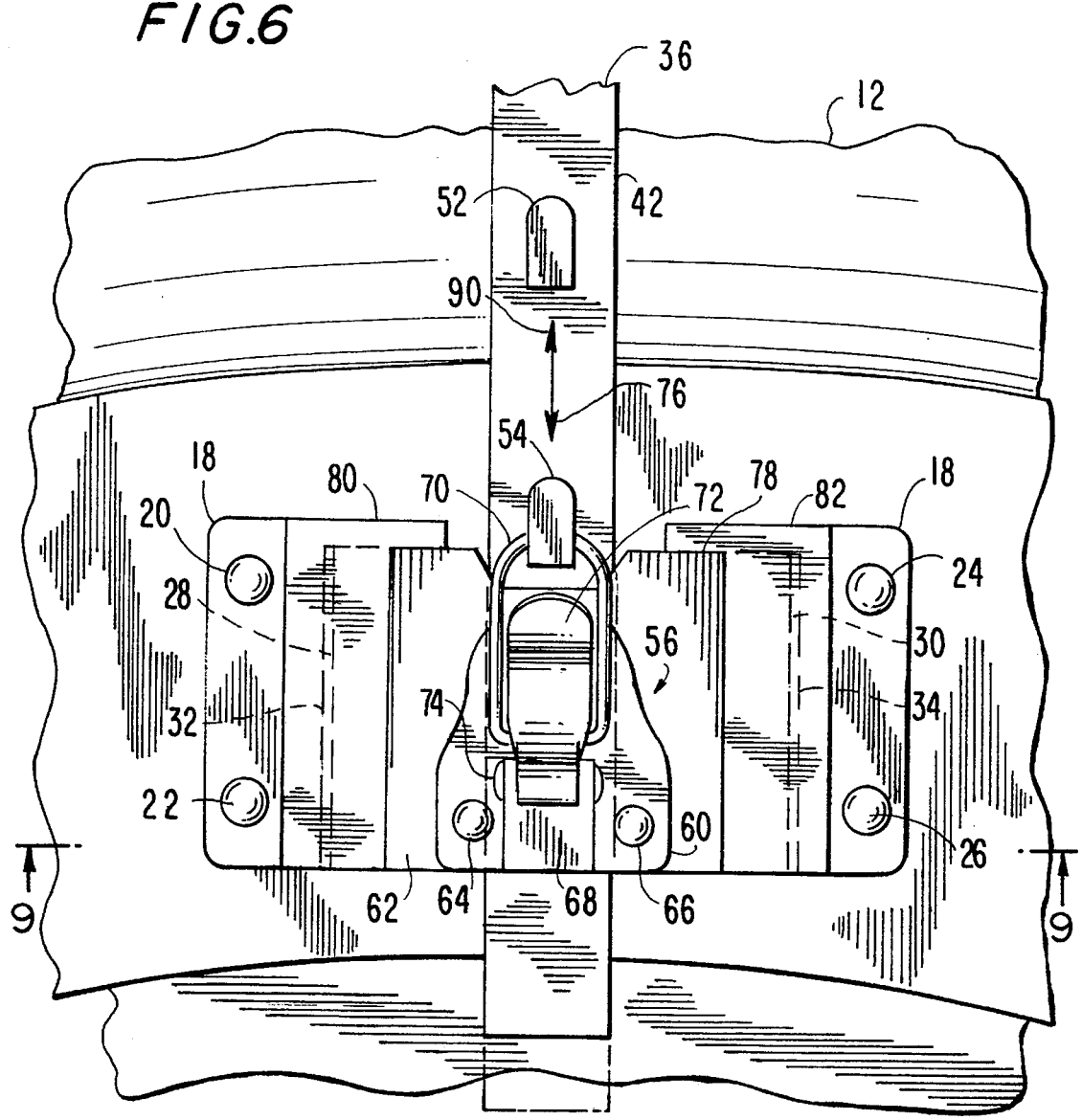
FIG. 6 is an elevation view taken along the line 6—6 of FIG. 2.

As is best shown in FIGS. 2, 3 and 6 each of the cleat assemblies 14 includes a pair of brackets 16,18 which are attached to the support ring 12 by rivets 20,22,24,26. The brackets 16,18 each include an undercut portion 28,30 which is indicated in FIG. 6 by the broken lines 32,34 and which is shown in cross-section in FIG. 9.

Each of the cleat assemblies 14 include a cleat unit 36 which extends across the tread portion 38 of a tire 40 to enhance traction in a manner which will be presently described. The cleat units 36 each include a vertical portion 42 which has an upper end 44 which is connected to a horizontal portion 46. The horizontal portion 46 rests on the tread portion 38 of the tire 40 as is shown in FIG. 2. A relatively short vertical portion 48 is connected to the end 50 of the horizontal portion 46. The vertical portions 48 each include at least one pair of hook portions 52,54 which cooperate with a latch assembly 56 in a manner, which will be presently described, to accomodate a range of tire diameters. The cleat units 36 preferably are formed as integral members.

The latch assembly 56, which is best shown in FIGS. 2, 3 and 6 includes a base plate 60 which is attached to a block 62 by a pair of rivets 64,66 and a pivot housing 68. A bail member 70 is pivotally mounted on an operating lever 72 and the operating lever 72 is pivotally mounted on the pivot housing 68 by means of a pin 74. During use, the bail member 70 engages one of the hooks 54 and when the operating lever 72 is pushed toward the base plate 60 the bail member 70 pulls the hook 52 in the direction shown by the arrow 76 in FIG. 6. The force exerted by the latch assembly 56 on the hook 54 causes the horizontal portion 46 of the cleat unit 36 to bear on the tire treads 38 as is shown in FIG. 2, and causes the surface 78 of block 62 to bear on the stop portions 80,82 of the brackets 16,18.

Figure 9:
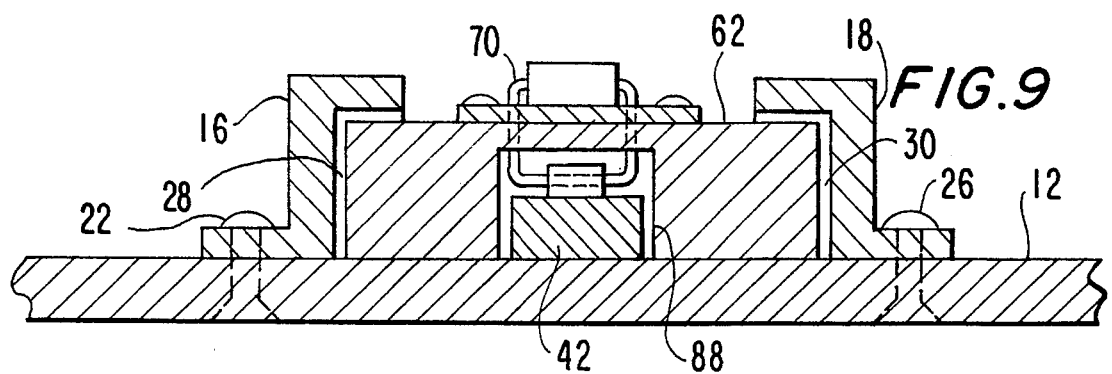
FIG. 9 is a cross-sectional view taken along the line 9—9 of FIG. 6.

As is shown in FIG. 9, the block 62 includes a channel portion 88 which is proportioned to accept the vertical portion 42 of the cleat unit 36 and to allow the vertical portion 42 to slide relative to the block 62. This allows the bail 70 to engage the hook 52 when the anti-skid device 10 is used with a tire having a smaller overall diameter.

The stop portions 80,82 of the brackets 16,18 prevent motion of the cleat unit 36 in the direction shown by the arrow 90 in FIG. 6, thereby holding the anti-skid device 10 securely on the tire 40. The vertical portion 48 prevents motion of the anti-skid unit 10 in the outward direction shown by the arrow 92 in FIG. 2, thereby completely securing the anti-skid device 10 to the tire 40.

As indicated previously, the brackets 16,18 allow the block 62 to slide in the direction shown by arrow 76, thereby allowing the tire 40 to flex under load, as is shown by the tire portion 94 shown in FIG. 2 and still allows the anti-skid device 10 to remain secured to the tire 40.

The operating surface 96 of the cleat unit 36 includes a plurality of projections 98 which are shown typically in FIGS. 3, 4 and 5 and which include cone shaped projections 100, cylindrical projections 102, pyramid projections 104 and various combinations of these projections 98. Similar shapes as well as a range of sizes of projections 98 may be provided. Several sets of cleat units 36 each having a different type of projection may be carried by a motorist in order to facilitate operation on a variety of road conditions. For example, relatively shorter and relatively sharper projections 98 such as are shown in FIGS. 3 and 5 may be provided for use on icy roads. Relatively larger and blunt projections 102 may be provided For use on snow covered roads.

To change a cleat unit 36, the latch assembly 56 is opened by pulling the operating lever 72 in the direction shown by the arrow 106 in FIG. 2. The bail 70 is removed from the hook 54 and the cleat unit 36 is slid out of the block 62. A new cleat unit 36 is installed simply by reversing this procedure and sliding the cleat unit 36 into the block 62 and engaging the latch assembly 56.

The anti-skid device 10 is attached to a tire 40 by simply placing the support ring 12 against the tire 40 and installing the cleat unit 36 to secure the anti-skid device 10 to the tire 40 as described above. There is no need to jack up the vehicle or to remove any of the wheel nuts 134.

The ease with which the cleat units 36 are installed and removed from the anti-skid device 10 using the latch assemblies 56 enables a motorist to carry a selection of cleat units and to easily install the optimum unit to accomodate various road conditions.

FIGS. 7 and 8 show an alternative version of the support ring 120 which incorporates a pair of semi-circular hinge portions 122,124. The hinge portions 122,124 each have integrally formed hinge brackets 126,128,130 and hinge pins 132. The hinge portions 122,124 allow the support ring 120 to be folded as shown in FIG. 8 for ease of storage. The support ring 120 is used with the cleat assemblies 14 in the manner which has been previously described.

The anti-skid device 10 may be made of metal, or alternatively, it may be made of a composite material which is light in weight. The cleat units 36 may be made of a high grade plastic material or a composite material which will minimize damage to the road surface.

The relatively short vertical portions 48 protrude beyond the tire 40 only to a minimal degree and provide adequate fender wall clearance and therefore do not interfere with various sensor elements which may be installed in an automobile for use with anti-lock braking devices.

Figure 10:
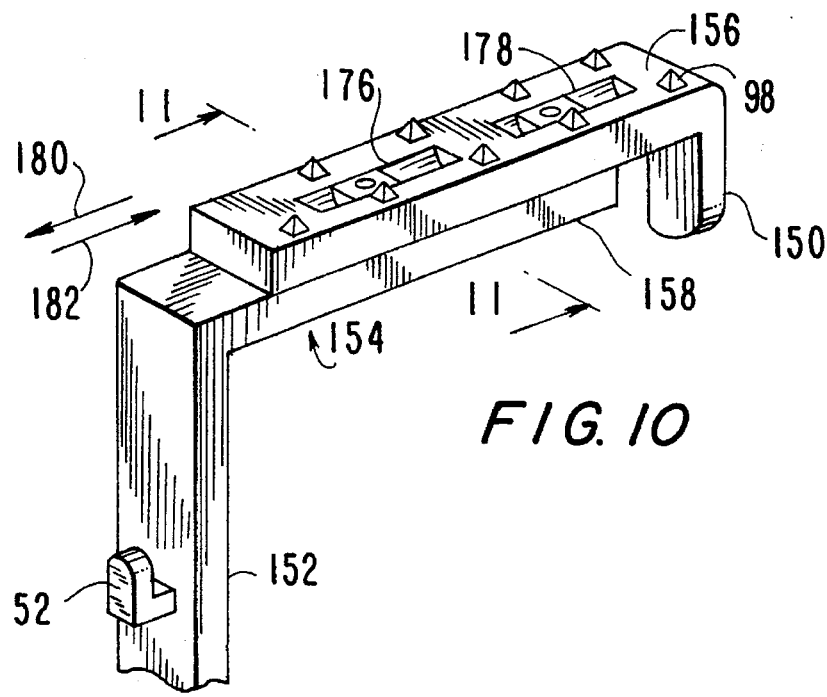
FIG. 10 is a perspective view of another alternative cleat unit which is adjustable to accomodate a range of tire widths.
Figure 11:
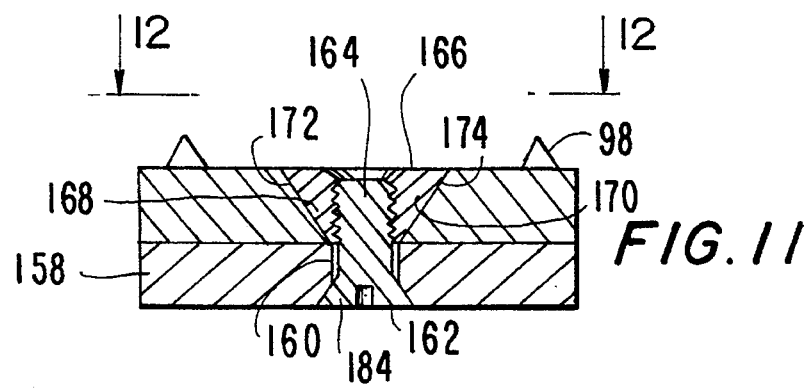
FIG. 11 is a cross-sectional view taken along the line 11—11 of FIG. 10.
Figure 12:
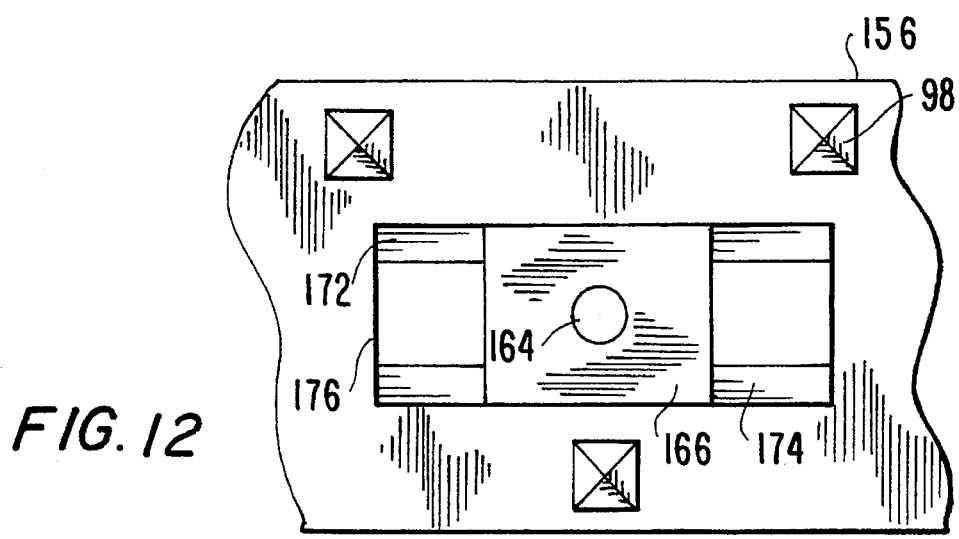
FIG. 12 is a fragmentary top view taken along the line 12—12 of FIG. 11.

FIGS. 10, 11 and 12 show an alternative version of the cleat unit 150 which is adjustable in order to accomodate a range of tire widths. The cleat unit 150 includes a first member which has a vertical portion 152 which is identical to the vertical portion 42 previously described, and a horizontal assembly 154. The horizontal assembly 154 includes a pair of members 156,188. The member 158 has a pair of holes, one of which 160, is shown typically in FIG. 11. The member 156 has a pair of slots 176,178 which have tapered surfaces 172,174.

A flat head screw 162 is mounted in the hole 160 and the end 164 of the screw 162 is threaded into a sliding nut 166 which has a pair of tapered surfaces 168,170 which abut the tapered surfaces 172, 174 formed on the slots 176,178 on member 156 of the cleat unit 150. The member 156 has a plurality of projections 98 which are identical to the projections 98 which have been previously described in connection with FIGS. 3, 4 and 5. The cleat unit 150 may be removed from the anti-skid device 10 using the latch assembly 56 previously described and the screws 162 may be loosened in order to move the member 156 in the direction shown by the arrows 180,182 in FIG. 10 in order to accomodate a range of tire widths. When the adjustment has been completed, the screws 162 are tightened and the cleat unit 150 is installed on the support ring 12. During use, the head 184 of the screw 162 abuts the tread surface 38 of the tire 40 which prevents the screw 162 from backing out and the sliding nut 166 is held securely in the slots 176,178.

Although the anti-skid device according to the present invention has been described with reference to automobile tires, it is clear that this has been done for purposes of illustration and it is clear that this device is equally appropriate for use on various types of trucks, emergency equipment and all manner of wheeled vehicles.

The foregoing specific embodiment of the present invention, as set forth in the specifications herein, is for illustrative purposes only. Various changes and modifications may be made within the spirit and scope of the invention.

What is claimed is:

1. An anti-skid device for tires comprising:
   a support ring having an outer diameter and an inner diameter, and with the direction starting from said inner diameter and projecting toward said outer diameter defined as a radially outward direction and with an opposite direction defined as a radially inward direction,
   a plurality of bracket means,
   attachment means disposed to attach each of said bracket means to said support ring,
   a plurality of block means with said block means slideably mounted, one each in said bracket means,
   stop means disposed on said bracket means and disposed to prevent radially outward sliding motion of said block means relative to said bracket means,
   cleat means comprising:
      an elongated first portion,
      an elongated second portion, and
      a third portion, with said second portion connected to said first portion and with said third portion connected to said second portion; with said first and said second portions forming an angular relationship, and with said second and said third portion forming an angular relationship,
   at least one hook means formed on said elongated first portion,
   a plurality of projections disposed on said second portion of said cleat means,
   with said elongated first portion of said cleat means slideably mounted in said block means, and
   latch means mounted on said block means and disposed for removeably engaging said hook means on said elongated first portion for the purpose of removeably connecting said cleat means to said block means and with said hatch means applying a force to said cleat means in said radially inward direction.

2. An anti-skid device for tires according to claim 1 further comprising a plurality of hook means disposed on said elongated first portion of said cleat means.

3. An anti-skid device for tires according to claim 1 in which said first and said second portions of said cleat means are substantially perpendicular.

4. An anti-skid device for tires according to claim 1 in which said second and said third portions of said cleat means are substantially perpendicular.

5. An anti-skid device for tires according to claim 1 in which said plurality of projections on said second portion of said cleat means comprises a plurality of cylindrical projections.

6. An anti-skid device for tires according to claim 1 in which said plurality of projections on said second portion of said cleat means comprises a plurality of pyramid shaped projections.

7. An anti-skid device for tires according to claim 1 in which said plurality of projections on said second portion of said cleat means comprises a plurality of conical shaped projections.

8. An anti-skid device for tires according to claim 1 in which said attachment means comprises rivets.

9. An anti-skid device for tires according to claim 1 in which said block means further comprises a cavity portion disposed adjacent to said support, ring and with said first elongated portion of said cleat means slideably projecting into said cavity portion.

10. An anti-skid device for tires according to claim 1 in which said support rink comprises:
   a first semi-circular portion,
   a second semi-circular portion, and
   hinge means connecting said first and said second semi-circular portions.

11. An anti-skid device for tires according to claim 1 in which said second elongated portion comprises
   a first member connected to said elongated first portion,
   a second member, and
   adjustable attachment means for adjustably attaching said first and said second members, thereby forming an adjustable aligned member of extended and adjustable length.

12. An anti-skid device for tires according to claim 11 in which said adjustable attachment means comprises a plurality of slot portions formed in said second member, a plurality of screws extending from said first member and projecting into said slot portions and a plurality of nuts engaging said screws.

13. An anti-skid device for tires according to claim 12 in which said slot portions include tapered wall portions and in which said nuts include tapered wall portions.

14. An anti-skid device for tires according to claim 11 in which said second portion further comprises a plurality of projections.

15. An anti-skid device for tires according to claim 1 in which said plurality of bracket means each comprise a pair of brackets, with each of said brackets having an undercut portion.

* * * * *